3,235,491
METHOD OF FLOCCULATING MINERAL SOLIDS COLLOIDALLY SUSPENDED IN AN AQUEOUS MEDIUM
Henry C. Rosenberg and Frederic R. Steward, Toronto, Ontario, Canada, assignors, by mesne assignments, to W. R. Grace & Co., New York, N.Y., a corporation of Connecticut
No Drawing. Filed Sept. 20, 1962, Ser. No. 225,110
4 Claims. (Cl. 210—52)

The present invention relates to a method of flocculating mineral solids suspended in an aqueous medium and has particular reference to the clarification of reclaimed process waters.

In the beneficiation of iron ores, coal washing, and other minerals recovery processes, the recovery or reclamation of wash water is always a principal problem. In many cases, water is scarce and its recovery is essential for continuation of process operations at an economical level. In other cases, the primary objective of water reclamation and water clarification is the alleviation of stream pollution.

The present invention is particularly applicable to the flocculation of mineral solids in which the principal contaminant consists of siliceous particles suspended in the aqueous medium. Heretofore, various flocculating agents such as gelatin, starch, vegetable meal, and the sulfates chlorides, or hydroxides of the heavy metals have been employed as flocculating agents. More recently, there has been considerable work on the use of synthetic water soluble polymers as flocculating agents for such suspensions. To our knowledge, however, none of these prior processes has resulted in unequivocal success. Metallic salts have the disadvantage that substantial amounts of the salts must be added to achieve clarification and even then clarification was only possible under rather carefully controlled conditions. The use of the water soluble polymers provided some advantage in this respect because smaller amounts of the polymers could be used, thereby reducing the problem of disposing of large concentration of additives, but the polymers are quite expensive. The need still remains, therefore, for an efficient flocculating process in the treatment of aqueous media containing suspended mineral solids in an economical and rapid process. The satisfaction of that need is the principal object of the present invention.

Another object of the present invention is to provide an improved method for flocculating siliceous particles in water which contains iron, aluminum, and other impurities in addition to the silica.

Still another object of the invention is to provide a flocculating process for aqueous media containing suspended mineral solids which makes use of inexpensive reagents in very small amounts.

A further object of the invention is to provide a method for flocculating mineral solids in aqueous suspension which does not require carefully controlled conditions for its successful operation.

The present invention is based upon the discovery that mineral solids which are suspended in an aqueous medium can be efficiently flocculated by treating the medium with ammonia in amounts of at least 5 parts per million, and preferably from 6 to 20 parts per million to cause rapid settling of the resulting agglomerated particles. Amounts in excess of 20 p.p.m. are usually unnecessary and could be uneconomical. The ammonia is preferably added as a solution ammonium hydroxide. Our studies have shown that it is the free ammonia and not the ammonium radical which operates to flocculate the mineral solids, since the addition of ammonium chloride or ammonium sulfate in the same concentration is ineffective to produce the same result.

In addition to free ammonia, certain organic amines have been found to have this property of flocculating mineral solids under the same conditions. Specifically, we have found that materials such as morpholine, cyclohexylamine, and di-n-butylamine are also effective to secure the results, but at concentrations which are considerably higher than those required in the use of ordinary ammonia. The cost involved in using such amines, therefore, is so much higher than involved in the use of ammonia that we do not consider the use of amines to be the economic equivalents of ammonia for the same purpose.

One of the discoveries incident to the development of the present invention was that the type of treatment required for successful flocculation with ammonia depends to a large extent upon the character of the zeta potential or electrokinetic potential of the medium being treated. In order to understand the significance of this factor, it would be well to discuss briefly the electrical behavior of colloidal particles.

Colloid particles with their large surfaces are likely to have ions attached to them. An ion induces a charge of opposite sign in an adjacent molecule and will thus be held to the surface by the ion-induced dipole attraction. The ions thus adsorbed exert a profound influence on the stability of the colloids. According to the simplest view, all the particles in a given colloidal solution tend to adsorb an excess of either positive or negative ions and thus acquire a charge. The particles thus repel each other and tend to prevent combination and precipitation of the colloidal material. The situation is more complicated, however, because the charged surface of the colloid particle tends to attract ions of opposite sign to it, forming two layers of oppositely charged electricity, as in a condenser. These electrical fields due to ions constitute what is known as a double layer.

A portion of the difference in potential exists between the movable and stationary liquid layers at the interface of these layers. The forces, which are sufficient in ordinary experiments to move the two sides of the ionic layer relatively to one another are much too small to remove the liquid and its charges from the actual surface of the solid. The layers of charge adhering to the solid surface moves with reference to the main body of liquid. Thus, the double layer stretches much farther out than a molecular distance from the solid surface into the liquid, and it is diffuse rather than compact. The total potential drop is between the surface of the solid and the movable liquid, but the zeta potential is that portion of the potential drop between the liquid adhering to the wall of the particle and the movable liquid.

Our studies have determined that the optimum treatment conditions for flocculating mineral solids depends upon the character of the zeta potential. If the particles have a positive zeta potential and settle out fairly well without any reagent additives, the flocculation properties of the particles can be substantially improved by the addition of ammonia alone. However, when the zeta potential of the particles is negative and when the particles settle out poorly without any treatment, it is necessary to add ferric ions to the medium in a concentration of at least 0.5 part per million and preferably from 5 to 10 parts per million in order to achieve proper clarification.

The pH of the medium being treated is apparently not a factor in securing proper flocculation, provided that the pH is sufficiently high to cause formation of insoluble ferric hydroxide in the medium. We have successfully operated at pH values of from about 4.4 to about 9.0 without noting significant changes in the flocculation characteristics upon changes in pH.

The following specific examples illustrate the benefits to be achieved from the practice of the present invention.

Settling tests were carried out on samples of untreated clarifier influent received from a mine in Quebec. Samples each measuring 1,000 ml. were settled for one hour and 24 hours respectively. The turbidity of the supernatant liquids was measured on a Bausch & Lomb electrophotometer at a wave length of 450 millimicrons and expressed in Jackson candle units. For these waters, turbidity in Jackson candle units can be converted to milligrams per liter by multiplying by 0.32.

from the thickener which had been supplied by the mine was digested with sulfuric acid and the supernatant liquid was diluted with distilled water to a concentration of 1.0 mg. ferric ion per 1.0 ml. of solution. The third procedure consisted in passing through the underflow from the thickener, a mixture of carbon dioxide, sulfur dioxide, and air and diluting the supernatant liquid with distilled water to a concentration of 1.0 mg. ferric ion per 1.0 ml. of solution.

The following table illustrates the results obtained from nine samples treated according to our process.

TABLE I

| Sample No. | pH | Suspended solids, mg./liter | | | Hardness in Solution, mg./l. | | | Turbidity After Settling | | Zeta Pot., mv. | Treatment for Good Clarification, p.p.m. | | Zeta Potential After Treated, mv. |
|---|---|---|---|---|---|---|---|---|---|---|---|---|---|
| | | $Fe_2O_3$ | $SiO_2$ | Total | Ca as $CaCO_3$ | Mg as $CaCO_3$ | Total $CaCO_3$ | 1 hr. | 24 hr. | | $Fe^{+++}$ | $NH_3$ | |
| | | | | | | | | Untreated J. C. Units | | | | | |
| 1 | 4.45 | 148 | 443 | 591 | 74 | 14 | 88 | 94 | 8 | +7 | 0 | 6 | +11 |
| 2 | 4.40 | 264 | 1,360 | 1,624 | 94 | 46 | 140 | 89 | 2 | +9 | 0 | 6 | +18 |
| 3 | 7.0 | 303 | 952 | 1,255 | 152 | 48 | 200 | 230 | 3 | −19 | 5 | 6 | −17 |
| 4 | 7.1 | 170 | 890 | 1,060 | 116 | 24 | 140 | 940 | 43 | −19 | 5 | 6 | −19 |
| 5 | 7.4 | 244 | 974 | 1,218 | 96 | 16 | 112 | 1,100 | 63 | −19 | 5 | 6 | −21 |
| 6 | 7.9 | 318 | 1,458 | 1,776 | 100 | 20 | 120 | 1,250 | 36 | −19 | 5 | 6 | −21 |
| 7 | 7.9 | 238 | 1,046 | 1,284 | 60 | 13 | 73 | 1,800 | 100 | −19 | 10 | 12 | −21 |
| 8 | 7.8 | 263 | 1,476 | 1,739 | 60 | 14 | 74 | 1,980 | 45 | −19 | 10 | 12 | −21 |
| 9 | 7.5 | 344 | 1,172 | 1,516 | 60 | 22 | 82 | 2,050 | 340 | −19 | 10 | 12 | −21 |

For the clarification tests, a six gang stirrer was used. After the addition of the chemicals, the samples were stirred rapidly for one minute. Then the speed was reduced to 8 r.p.m. which is equivalent to a circumferential speed of approximately six feet per minute and stirred for 30 minutes. The agglomerated particles were allowed to settle for 15 minutes and the supernatant liquid was observed for clarity. If the turbidity was less than 10 Jackson candle units, the supernatant liquid was considered clear.

The zeta potential was measured with a Riddick zeta meter as described in J.A.W.W.A., volume 53, page 1007, August 1961.

The ammonia was added in the form of diluted ammonium hydroxide.

The soluble ferric iron was prepared in three ways. In the first, ferric sulfate was dissolved in distilled water and diluted so that 1.01 ml. of solution contained 1.0 mg. ferric ion. In the second procedure, the underflow Portions of sample Nos. 1 and 2 were treated with various flocculating agents and under various conditions with the following results:

TABLE II

| Run No. | Treatment Material | P.p.m. | pH at the end | Floc | Supernatant |
|---|---|---|---|---|---|
| 1 | $Na_2CO_3$ | 46.0 | 6.5 | Poor | Turbid. |
| 2 | $Na_2CO_3$ | 53.0 | 7.5 | do | Do. |
| 3 | $Na_2CO_3$ | 71.0 | 8.5 | do | Do. |
| 4 | $Na_2CO_3$ / Alum | 86.0 / 80.0 | 6.5 | Good | Clear. |
| 5 | $Ca(OH)_2$ | 33.0 | 6.5 | Poor | Turbid. |
| 6 | $Ca(OH)_2$ | 47.0 | 8.5 | do | Do. |
| 7 | $Ca(OH)_2$ / Alum | 60.0 / 50.0 | 6.5 | Good | Clear. |
| 8 | $Na_2CO_3$ | 25.0 | 4.6 | Poor | Turbid. |
| 9 | $NH_3$ | 4.0 | 4.45 | Poor | Do. |
| 10 | $NH_3$ | 6.0 | 4.45 | Very good | Clear. |
| 11 | $NH_3$ | 8.0 | 4.7 | do | Do. |
| 12 | $NH_3$ | 15.0 | 6.5 | do | Do. |
| 13 | $NH_3$ | 23.0 | 8.5 | do | Do. |
| 14 | Morpholine | 87.0 | 7.5 | do | Do. |
| 15 | Cyclohexylamine | 100.0 | 7.5 | do | Do. |
| 16 | Di-n-butylamine | 129.0 | 7.5 | do | Do. |
| 17 | $(NH_4)_2SO_4$ | 66.0 | 4.45 | None | Turbid. |
| 18 | $NH_4Cl$ | 53.5 | 4.45 | do | Do. |
| 19 | Versene Fe-3 Specific / $NH_3$ | 3.0 / 8.0 | 6.0 | do | Do. |
| 20 | Versene Fe-3 Specific / $Fe^{+++}$ / $NH_3$ | 3.0 / 0.5 / 8.0 | 6.0 | Very good | Clear. |
| 21 | Amylopectin | 10.0 | 4.45 | None | Turbid. |
| 22 | $Na_3PO_4$ | 54.66 | 4.4 | Poor | Do. |

The "Versene" material referred to in the foregoing table is a commercially available sequestering agent for iron.

From Table II, it will be seen that small amounts of ammonia were effective to produce a substantial improvement in the properties of the floc and in eliminating turbidity in the supernatant liquid. None of the other reagents yielded the same results, even in very substantially higher amounts.

The effect of adding ferric ions is clearly demonstrated in the following examples.

*Example 1*

A portion of sample No. 4 was treated with sufficient sulfuric acid to bring the pH to 4.5, and 12 parts per million of ammonia added. The floc which resulted was very poor and the supernatant liquid was turbid. Another portion of the same sample was adjusted to a pH value of 4.5 with sulfuric acid, and was treated with 5.0 parts per million ferric ions and 6.0 parts per million ammonia. The floc was very good and the supernatant liquid was completely clear.

*Example II*

Portions of sample No. 8 were treated with enough sulfuric acid to bring the pH to 4.5, and 12.0 parts per million of ammonia were added. The floc was very poor and the supernatant liquid was still turbid, under the conditions of test. Another portion of sample No. 8 was treated with sulfuric acid in amounts sufficient to bring the pH to 4.5, and 12.0 parts per million ammonia in combination with 10.0 parts per million of ferric ion were added. Under the test conditions, the floc was very good, and the supernatant liquid was clear.

*Example III*

A portion of sample No. 9 was treated with sulfuric acid to bring the pH to 4.5, and 12.0 parts per million of ammonia were added. The floc which resulted was poor and the supernatant liquid turbid. The treatment of another portion of the same sample with the same amounts of sulfuric acid, but with the addition of 10.0 parts per million of ferric ion produced a very good floc and a clear supernatant liquid.

While in each of the above examples, there was a pH adjustment made, such adjustment is not essential to the operation of the process as witnessed by the data shown in Table I. All that appears to be necessary is the maintenance of a pH which is favorable to the precipitation of ferric hydroxide.

It should be evident that various modifications can be made to the described embodiments without departing from the scope of the present invention.

We claim as our invention:

1. A method of flocculating siliceous mineral solids colloidally suspended in an aqueous medium containing at least 0.5 part per million ferric ions which comprises adding ammonia to said medium in an amount of from 6 to 20 parts per million, while said medium has a pH sufficiently high to cause formation of insoluble ferric hydroxide, and settling the resulting agglomerated siliceous particles.

2. A method of flocculating siliceous mineral solids colloidally suspended in an aqueous medium and having a negative zeta potential which comprises adding to said medium ferric ions in an amount of at least 0.5 part per million, and treating the medium with ammonia in amounts of from 6 to 20 parts per million to cause settling of the suspended siliceous particles.

3. A method of flocculating siliceous mineral solids colloidally suspended in an aqueous medium and having a negative zeta potential which comprises adding to said medium ferric ions in an amount of at least 0.5 part per million and treating the medium with ammonia in amounts of 6 to 20 parts per million to cause settling of the suspended siliceous particles.

4. A method of flocculating mineral solids colloidally suspended in an aqueous medium and having a negative zeta potential which comprises adding to said medium ferric ions in an amount of from 5 to 10 parts per million, and treating the medium with ammonia in amounts of from 6 to 20 parts per million to cause settling of the suspended particles.

References Cited by the Examiner
UNITED STATES PATENTS

| | | | |
|---|---|---|---|
| Re. 14,583 | 1/1919 | Schwerin | 210—57 X |
| 2,267,831 | 12/1941 | Liebknecht et al. | 210—54 X |
| 2,924,515 | 2/1960 | Chapman et al. | |
| 2,924,578 | 2/1960 | Guptil | 210—42 X |

OTHER REFERENCES

Colloidal Dispersions, Fischer, 1950, John Wiley & Sons, Inc., New York, N.Y., pages 124–127 particularly relied on.

MORRIS O. WOLK, *Primary Examiner.*